United States Patent [19]

Evans et al.

[11] Patent Number: 5,109,156

[45] Date of Patent: Apr. 28, 1992

[54] LIGHT ACTUATED OPTICAL LOGIC DEVICE

[75] Inventors: Joseph T. Evans; Jeff A. Bullington, both of Albuquerque, N. Mex.

[73] Assignee: Radiant Technologies, Inc., Albuquerque, N. Mex.

[21] Appl. No.: 603,530

[22] Filed: Oct. 25, 1990

[51] Int. Cl.$^5$ ............................................. H01J 31/50
[52] U.S. Cl. ................................. 250/213 A; 359/108
[58] Field of Search .......... 250/213 A, 211 J, 227.11, 250/227.21; 377/102; 372/8, 50; 350/96.13, 96.14; 359/108, 322-324; 385/14

[56] References Cited

U.S. PATENT DOCUMENTS

| | | | |
|---|---|---|---|
| 4,767,196 | 8/1988 | Jewell | 350/354 |
| 4,776,658 | 10/1988 | Normandin | 350/96.15 |
| 4,887,877 | 12/1989 | Inoue et al. | 350/96.11 |
| 4,900,134 | 2/1990 | Inoue et al. | 350/96.13 |
| 4,941,725 | 7/1990 | Normandin | 350/96.13 |
| 4,978,842 | 12/1990 | Hinton et al. | 250/213 A |
| 4,992,654 | 2/1991 | Crossland et al. | 250/213 A |
| 4,999,486 | 3/1991 | Falk | 250/213 A |

*Primary Examiner*—David C. Nelms
*Assistant Examiner*—Michael Messinger
*Attorney, Agent, or Firm*—McCubbrey, Bartels, Meyer & Ward

[57] ABSTRACT

A light activated AND gate is disclosed which generates a light signal at a first output port in response to the simultaneous presence of light signals at an input port and a control port. With a light signal present at the control port, a light beam at the input port is reflected from an interface between two regions having different indices of refraction, and the reflected light beam then exits through a first output port. In the absence of a light signal at the control port, the two regions of the switching device have the same index of refraction, and the light beam at the input port passes through both regions and exits through a second output port.

9 Claims, 3 Drawing Sheets

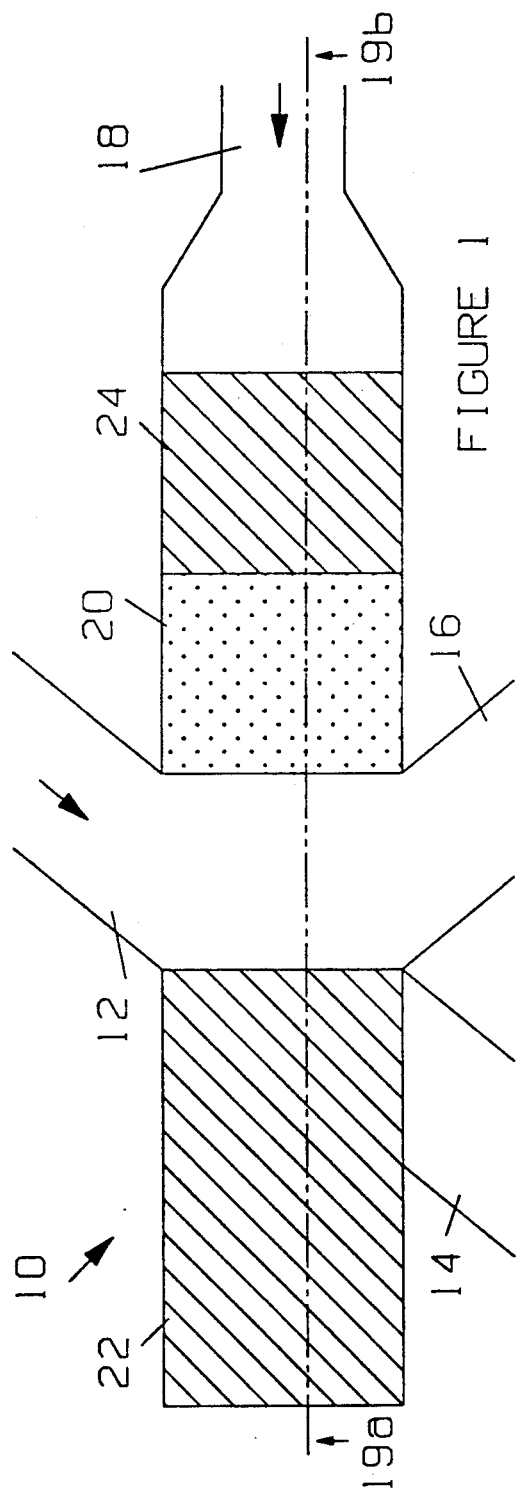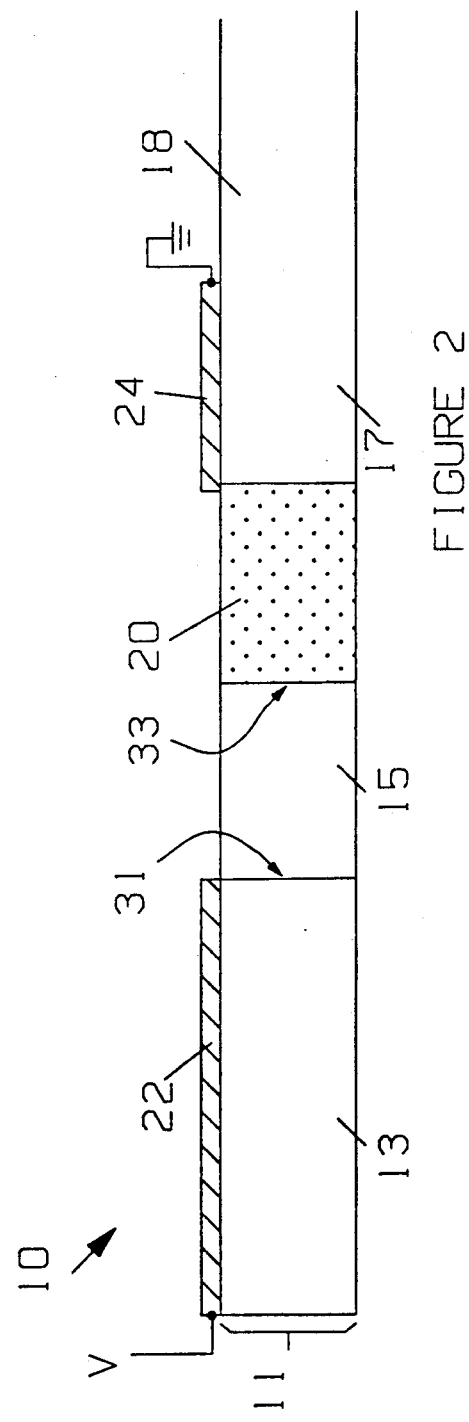

LIGHT ACTUATED OPTICAL LOGIC DEVICE

BACKGROUND OF THE INVENTION

The present invention relates to logic devices for use in computers and other computational devices utilizing light beams, and more particularly to a light actuated switching device which functions as an optical AND gate, INVERTER, or BUFFER.

Communication and computational systems utilizing switched light beams have the potential of providing substantial improvements in telephone and computer systems. Fiber optic transmission lines are already being utilized to increase the capacity of telephone systems. Computing devices based on switching light beams hold the promise of dramatic increases in the capacity and speed of computers.

Computational devices based on circuits in which light signals serve a function analogous to that served by electrical signals in conventional computers have long been sought as a means of dramatically increasing the computational capacity of computers. Such devices would utilize optical fibers to transmit signals between various logic elements. Ideally, the logic elements would operate directly on these light signals to produce other light signals representing the results of the computations. In practice, most light switching circuits rely on electrical signals for their control. As a result, the logic elements based on these circuits are limited in speed.

For example, optical equivalents to a logical AND gate are typically generated by first converting the two light signals to electrical signals which are then processed by a conventional AND gate. The output signal generated by the electrical AND gate is then converted to a light signal by a laser diode. The speed of the AND gate is hence limited by the speed with which the electrical components can operate.

Broadly, it is an object of the present invention to provide an improved optical AND gate switching device which generates a light output signal in response to the simultaneous presence of two specified light input signals.

It is a further object of the present invention to provide an optical AND gate switching device which is not limited by the speed at which electrical signals can be switched.

These and other objects of the present invention will become apparent to those skilled in the art from the following detailed description of the invention and the accompanying drawings.

BRIEF DESCRIPTION OF THE DRAWINGS

FIG. 1 is a top view of an optical AND gate according to the present invention.

FIG. 2 is a cross-sectional view of the optical AND gate shown in FIG. 1.

SUMMARY OF THE INVENTION

Figure 3:
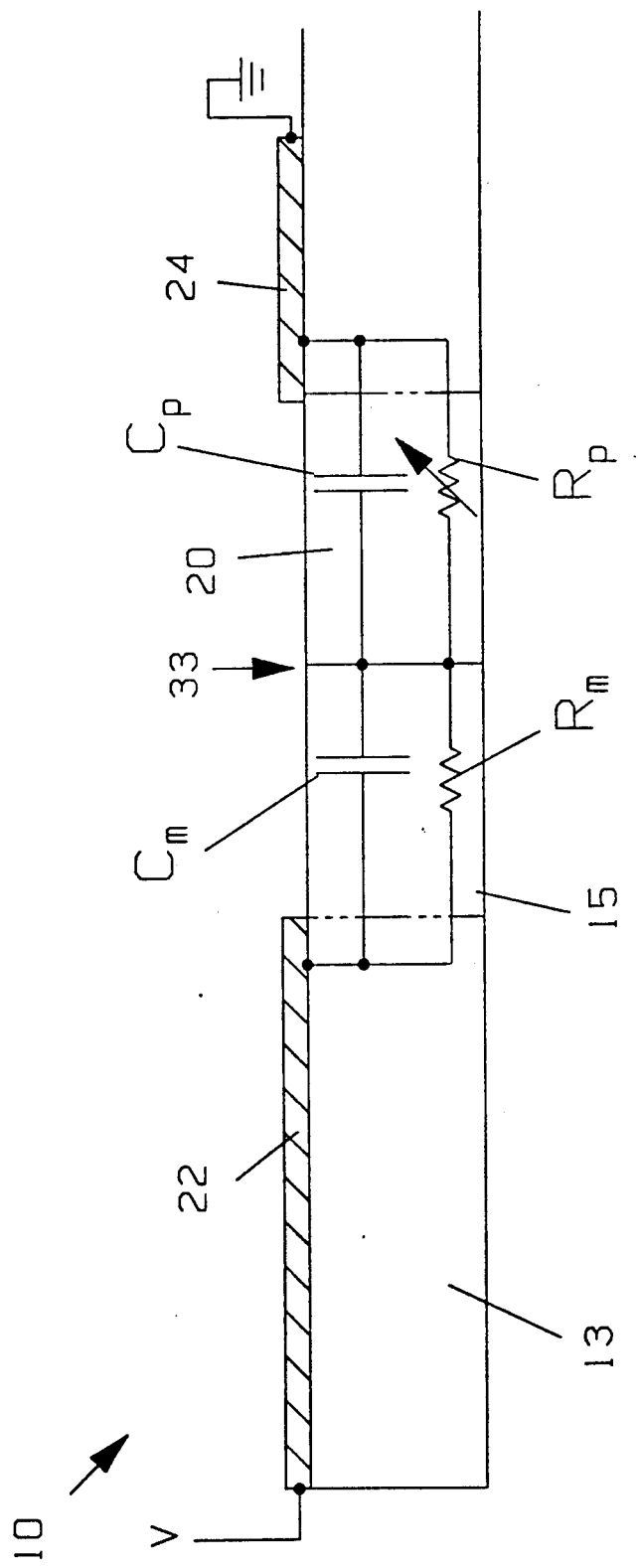
FIG. 3 is an equivalent circuit for the optical logic gate shown in FIG. 1.

The present invention comprises a logic gate in which a light signal is present at a first output port if light signals are present at first and second input ports. The invention includes a transparent region having a predefined boundary. A modulation region is used to switch a portion of a light beam input through the first input port to the first output port. The modulation region has first and second boundaries, the first boundary being coincident with said boundary of said transparent region. The modulation region has first and second indices of refraction, the first index of refraction being substantially equal to that of the transparent region. The index of refraction of said modulation region is switched between the first and second indices by the generation of an electric field in the modulation region. The first input port receives light and directs the light toward the first boundary at a predetermined angle with respect thereto. The first output port is positioned so as to receive light input through the first input port when said light is reflected from the first boundary. A field generator produces a potential difference between said first and second boundaries of said modulation region in response to said second port receiving a light signal.

DETAILED DESCRIPTION OF THE INVENTION

The present invention may be most easily understood with reference to FIGS. 1 and 2. FIG. 1 is a top view of an optical AND gate 10 according to the present invention. FIG. 2 is a cross-sectional view of optical AND gate 10 taken through line 19a–19b. Optical AND gate 10 accepts light through an input light pipe 12 and transmits that light either through output light pipe 14 or output light pipe 16. If no light is input to control light pipe 18, the light from input light pipe 12 exits through output light pipe 14. However, if light having a wavelength less than a predetermined wavelength is input to control light pipe 18, the light from input light pipe 12 exits through output light pipe 16. Hence, light will be present at output light pipe 14 if light is present at control light pipe 18 AND light pipe 12. That is, light pipe 12 acts as one input to the AND gate and control light pipe 18 acts as the second input.

Optical AND gate 10 is preferably constructed from a thin optically transparent layer 11 of paraelectric material. The manner in which this layer is deposited and processed will be discussed in more detail below. For the purpose of the present discussion, it is sufficient to note that layer 11 is divided into four regions, 13, 15, 20, and 17. Region 13 is a portion of layer 11 which underlies an electrode 22. Adjacent thereto is region 15. The interface between regions 13 and 15 is shown in FIG. 2 at 31. When no light is input to control light pipe 18, regions 13 and 15 have the same index of refraction. For reasons that will become apparent from the following discussion, region 15 will be referred to as the modulation region.

Adjacent to modulation region 15 is the third region which will be referred to in the following discussion as photoconductive region 20. Photoconductive region 20 is preferably constructed by ion implantation of thin film 11. The details of the ion implantation will be discussed in more detail below. For the purposes of the present discussion, it is sufficient to note that photoconductive region 20 is essentially an electrical insulator in the absence of illumination. When illuminated with light, photoconductive region 20 becomes an electric conductor. The light in question is the light input through control light pipe 18. The boundary between photoconductive region 20 and modulation region 15 is shown at 33 in FIG. 2.

The fourth region 17 underlies a second electrode 24 and connects photoconductive region to control light pipe 18.

A constant potential difference of V is generated between electrodes 22 and 24 by connection to suitable potential sources. For the purposes of this discussion, it will be assumed that electrode 22 is connected to a potential V, and electrode 24 is connected to ground. However, it will be apparent to those skilled in the art that other choices of potentials will also function adequately.

Optical AND gate 10 switches the light input through light pipe 12 to output light pipe 16 by altering the index of refraction of modulation region 15. When modulation region 15 has a sufficiently different index of refraction from region 13, the boundary at interface 31 will reflect light incident thereon. If the angle of incidence of the light is sufficiently shallow with respect to interface 31, the light will be totally reflected from boundary 31. The angles in question will be discussed in more detail below.

As noted above, region 13 and modulation region 15 are preferably constructed from a thin film of paraelectric material. In the absence of an electric field in modulation region 15, it will have the same index of refraction as region 13. Hence, no boundary will exist between the two regions. As a result, light entering light pipe 12 will traverse modulation region 15 and region 13 and then exit through output light pipe 14.

The manner in which an electric field is generated in modulation region 15 in response to light being input through control light pipe 18 will now be explained with the aid of FIG. 3. FIG. 3 is an equivalent circuit for optical AND gate 10. Modulation region 15 is electrically equivalent to the parallel combination of capacitor $C_m$ and resistor $R_m$. In the preferred embodiment of the present invention, $R_m$ is typically $10^{12}$ ohms. Capacitor $C_m$ is the capacitance between electrode 22 and interface 33.

Photoconductive region 20 is electrically equivalent to the parallel combination of capacitor $C_p$ and variable resistor $R_p$. $C_p$ is the capacitance between interface 33 and electrode 24. In the absence of light, $R_p$ is very large. As will be discussed below in more detail, in the preferred embodiment of the present invention, $R_p$ is typically $10^{14}$ ohms. In the presence of light, $R_p$ is typically less than a thousand ohms.

The manner in which the change in value of $R_p$ is utilized in the present invention to switch the index of refraction of modulation region 15 is most easily understood by considering the steady state voltage at interface 33. In the presence of light, $R_p$ is much smaller than $R_m$. In this case, interface 33 will be essentially at ground. As a result, the voltage drop across modulation region 15 will be V. That is, there will be a substantially constant electric field in modulation region 15. As noted above, modulation region 15 preferably comprises a paraelectric material. As will be appreciated by those skilled in the art, the index of refraction of a paraelectric changes in response to an electric field being generated therein. Hence, when light is present in photoconductive region 20, an electric field will be present in modulation region 15, causing a change in its index of refraction. However, no such field will be present in region 13. Hence interface 31 shown in FIG. 2 will separate regions of differing indices of refraction.

When no light is incident on photoconductive region 20, $R_p$ is much larger than $R_m$. In this case, the potential at interface 33 will be substantially equal to V, the same potential as electrode 22. Thus, there will be substantially no potential difference between electrode 22 and interface 33. As a result, the electric field in modulation region 15 will be substantially equal to that in region 13. Since region 13 and modulation region 15 are constructed from the same material, the interface 31 will be absent.

As noted above, $R_m$ and $R_p$, when no light is present in photoconductive region 20, are quite large. It is an object of the present invention to construct an optical AND gate that switches quickly. The transient response of optical AND gate 10 depends upon $C_m$ and $C_p$. As will now be explained in detail, the preferred embodiment of the present invention is constructed such that $C_m$ is much larger than $C_p$.

Consider the case in which light is present in photoconductive region 20 and then is suddenly turned off. Just before the light is turned off, the potential at interface 33 is substantially equal to ground. Just after the light is turned off, insufficient time will have elapsed for current to flow through $R_m$ to charge $C_p$. Hence, the circuit will appear to be a simple pair of series connected capacitors. Thus, potential of V will appear across the series combination of $C_m$ and $C_p$. To obtain fast switching, the potential at interface 33 must jump to V. This will be the case if $C_m$ is much larger than $C_p$ In the preferred embodiment of the present invention, this is accomplished by altering the dielectric constant of photoconductive region 20. As will be explained in more detail below, the dielectric constant of photoconductive region 20 can be reduced by ion bombardment of said region.

In the case in which photoconductive region 20 is suddenly exposed to light after being in the dark, there is no capacitive charging problem. In this case, interface 33 is directly connected to ground through resistor $R_p$, which is less than 1000 ohms when photoconductive region 20 is exposed to light. As long as $R_p C_p$ is small compared to the rise time of the light pulse incident through control light pipe 18, optical AND gate 10 will switch in a time comparable to the rise time of said light pulse. Here, $R_p$ is the value of this resistance in the presence of light.

Figure 4:
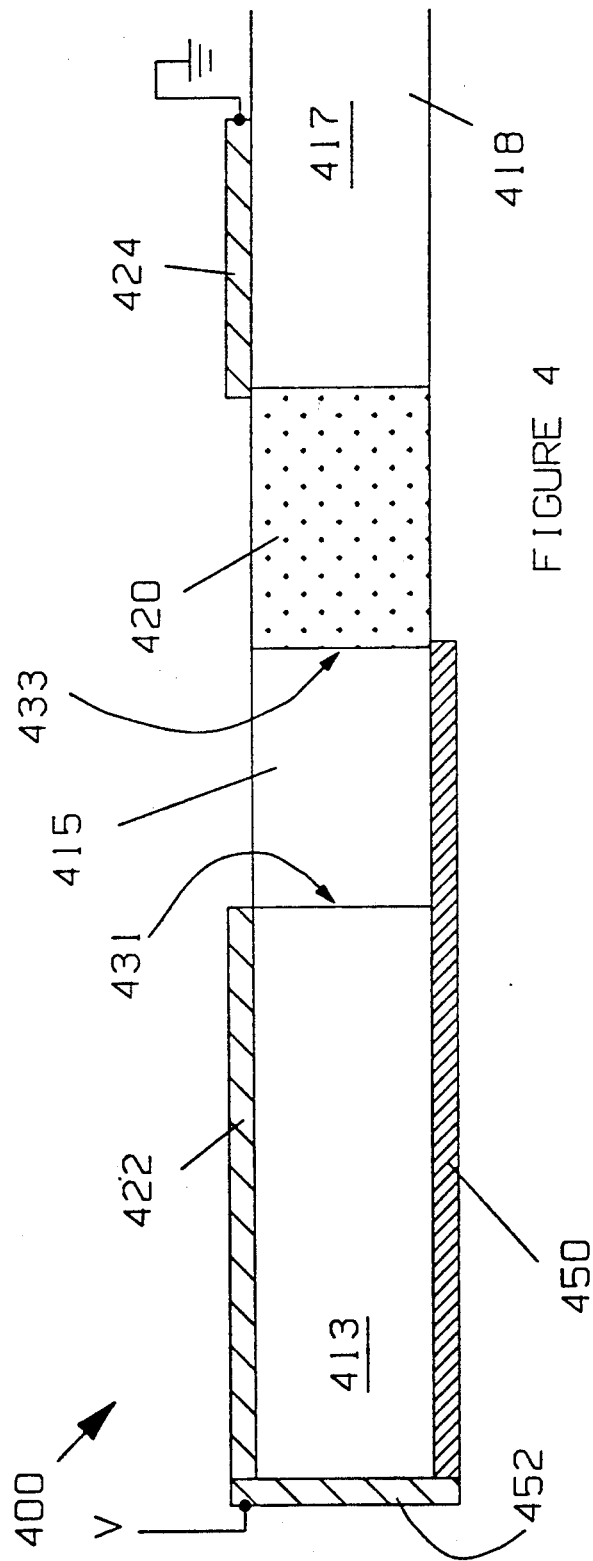
FIG. 4 is a cross-sectional view of an alternative embodiment of the optical logic gate shown in FIG. 1.

An alternative embodiment of the present invention is shown in FIG. 4 at 400. This embodiment utilizes a pull-up resistor to improve the switching speed after the light at the control port is turned off. FIG. 4 is a cross-sectional view of optical AND gate 400. Optical AND gate 400 differs only in the addition of a resistive layer 450 which is connected to the electrode that is connected to V by a conductive layer 452. The other elements of optical AND gate 400 are analogous to those shown in FIG. 1; hence they are labeled with like numbers. Resistive layer 450 provides a resistive connection between interface 433 and electrode 422. The resistance of resistive layer 450 is denoted by $R_s$.

Figure 5:
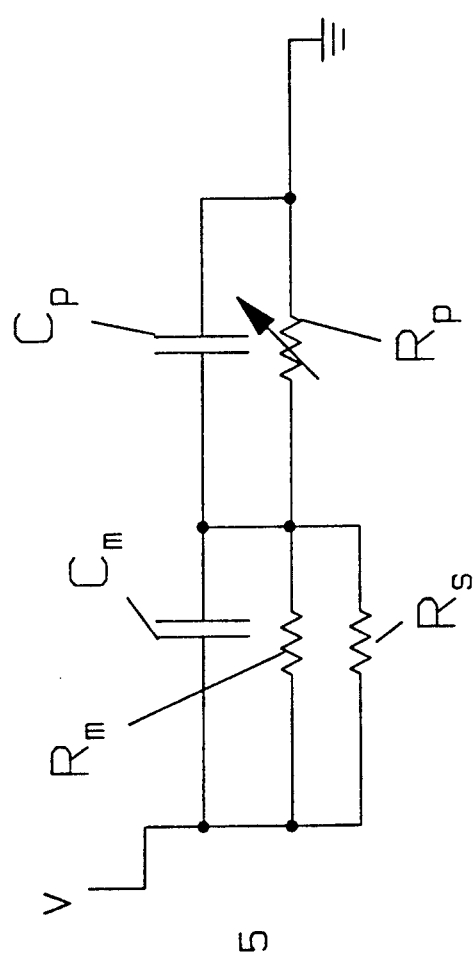
FIG. 5 is an equivalent circuit for the embodiment of the optical logic gate shown in FIG. 4.

An equivalent circuit for optical AND gate 400 is shown in FIG. 5. $R_s$ is chosen to be much smaller than $R_m$. However, it is also much greater than $R_p$ when light is present on photoconductive region 420. When photoconductive region 420 is illuminated, interface 433 will again be at a potential substantially equal to V. When the light is removed from photoconductive region 420, interface 433 will change to potential V with a time constant essentially equal to $R_s C_p$. Hence, including resistive layer 450 allows a shorter switching time independent of the relationship between $C_p$ and $C_m$.

Thus, the optical AND gate of the present invention provides an optical output signal at output light pipe 16 when an optical input signal is present both at input light pipe 12 and at control light pipe 18. In addition, the device does not provide an optical output signal at output light pipe 16 if the optical input signal is absent either at input light pipe 12 or at control light pipe 18. This constitutes the operation of a traditional AND gate having inputs 12 and 18, and having output 16.

The device of the present invention can be utilized as an INVERTER. If a constant intensity light source is provided at light pipe 12, a light signal will be present in light pipe 14 only when no light signal is present in control light pipe 18. If light pipe 16 is considered to be the output, then the present invention also provides a conventional BUFFER function.

In the preferred embodiment of the present invention, regions 13, 15, 20, and 17 are constructed from a thin film of paraelectric material which is deposited on the surface of a suitable substrate. The material in question is preferably a lead lanthanum zirconate titanate (PLZT). By adjusting the composition of the constituents, the material can be caused to be either paraelectric or ferroelectric. The film is typically a structure of the form $ABO_3$ where the A site may be filled by either lead or lanthanum and the B site may be filled with either zirconium or titanium. A paraelectric film may be obtained by adjusting the composition of the A site to 91% lead and 9% lanthanum and the B site to 65% zirconium and 35% titanium. A ferroelectric film may be obtained by omitting the lanthanum from the A site and adjusting the composition of the B site to 60% zirconium and 40% titanium. Other compositions will be apparent to those skilled in the art.

The material may be deposited on the substrate using sputtering, chemical vapor deposition, or sol gel deposition. The preferred method of deposition is the conventional sol gel deposition technique. In this technique, a solution of the PLZT material is spun onto the substrate. The solution consists of a solvent carrying a metal organic complex which has been partially jelled into long chains. The chains consist of a linear array of metal atoms alternating with oxygen atoms and coordinated with hydrocarbon groups along the outside of the linear array. The chains are normally formed by hydrolysis of alkoxides which are individual metal atoms bonded to the hydrocarbons. The alkoxides are mixed to produce the desired ratio of metal atoms in the final ceramic and then water is added to the mixture. The water hydrolyzes the individual alkoxide molecules into the chains which remain suspended in the solvent. In this way, metal oxide molecules are dissolved in solvents such as simple alcohols.

The sol gel is spun onto the substrate using a conventional spinning apparatus. The solvent evaporates during the spinning, leaving the surface of the substrate coated with metal organic chains. The substrate is then heated gradually to evaporate the remaining solvent. After the solvent has been evaporated, the coated substrate is heated further to break the hydrocarbon bonds. As a result, hydrogen, carbon, and oxygen are released, leaving a coating of metals and oxygen. The substrate is then raised to a temperature which sinters the amorphous layer into its ceramic form. For PLZT, the hydrocarbons evaporate below 400 degrees Centigrade.

After deposition, the film is sintered to form the final ceramic layer. The temperature at which the film is sintered may also be used to control the properties of the film. For example, if a 98% lead, 2% lanthanum, 65% zirconium, and 35% titanium composition is used, the final film will be a ferroelectric if heated to 550 degrees Centigrade. However, if the sintering takes place between 400 and 500 degrees Centigrade, a pyrochlore structure will be formed. Such a structure is paraelectric as opposed to the perovskite structure obtained at the higher temperature which is ferroelectric.

For the purposes of the present discussion, it will be assumed that modulation region 15 is a paraelectric structure. The use of ferroelectric structures will be discussed in more detail below.

For PLZT materials, the difference in the indices of refraction between the two states of polarization is approximately equal to 0.002. PLZT materials are preferred because this is among the highest differences in index of refraction that can be obtained with a material capable of withstanding the temperatures used in conventional semiconductor processing. It will be apparent to those skilled in the art that it would be advantageous to be able to construct light switching devices on the same substrate as conventional integrated circuits.

Photoconductive region 20 is also preferably constructed from the same thin PLZT film. After deposition, photoconductive region 20 is differentiated from modulation region 15 by the introduction of ions that will cause it to become photoconductive when illuminated with light having a wavelength less than a predetermined critical wavelength. The ions in question can be introduced by ion implantation techniques or other conventional techniques such as diffusion. It should be noted that the process of ion implantation also reduces the dielectric constant of the PLZT film. It has been found that a difference in dielectric constant of a factor of 10 can be obtained by ion implantation.

In the absence of doping, PLZT materials become photoconductive when illuminated with light having a wavelength less than 0.35 microns. If photoconductive region 20 is doped with argon and nickel ions, this critical wavelength can be increased to approximately 0.57 microns. If iron ions are used, the wavelength is increased to approximately 0.7 microns. Finally, if neodymium or silicon ions are used, the wavelength can be extended to approximately 1 micron. The above ion implantation can be effected at energies between 50 Kev and 100 Kev if control region 112 is approximately 0.5 microns in thickness. The final concentration is preferably about $10^{18}$ ions/cm$^3$.

The critical wavelength is preferably longer than that of the light input through input light pipe 12. Hence, neodymium and silicon ions are preferred. This allows optical AND gates according to the present invention to operate on the output light signals provided by other such gates. That is, both of the inputs to the AND gate may be generated by similar AND gates. If this condition is not satisfied, some form of wavelength shifter such as a wavelength doubler must be used at the input to the control port to allow a light signal from a similar gate to act as the control signal to the AND gate.

The angle at which input light pipe 12 introduces light into modulation region 15 depends upon the difference of index of refraction of modulation region 15 and region 13 when photoconductive region 20 is exposed to light. In the preferred embodiment of the present invention, this angle is sufficient to cause the light from input light pipe 12 to be totally internally reflected from interface 31. The reflected light exits light AND gate switching device 10 through output light pipe 16. As noted above, the preferred embodiment of the present invention utilizes PLZT materials in which a difference in index of refraction of about 0.002 may be generated. For these materials, the angle of incidence of light on interface 31 must be at least 88.5° with respect to the normal to the surface of interface 31.

However, it will be apparent to those skilled in the art that total internal reflection is not always required. In particular, there are applications in which the output of the AND gate is used as an input to a device having sufficient gain to compensate for the loss of intensity. For example, the output of the AND gate could be used as the input to another AND gate, provided that the input in question is the one entering the control light pipe, i.e., light pipe 18 shown in FIG. 1. Control light pipe 18 will function correctly with as little as 1/1000th the light intensity typically present at input light pipe 12.

As noted above, the preferred material for constructing the modulation region and control region is PLZT. This material has the highest difference in index of refraction of any non-organic material. Since it is important that both the modulation region and photoconductive region be able to withstand the temperatures inherent in semiconductor processing, organic materials are not suitable. In addition, by adjusting the composition of the PLZT materials, modulation regions which are either paraelectric or ferroelectric can be obtained. In general, if a fast switching device is required, a paraelectric material is preferred since it returns to the same state of polarization after the electric field is removed.

The above embodiments of the present invention have utilized an interface which is planar for the reflection of the light received by the input light pipe. However, it will be apparent to those skilled in the art that interfaces having different geometric configurations are also useful. For example, a concave shaped interface could be used to focus the incoming light into the output light pipe.

There has been described herein a light switching device which functions as an optical AND gate. Various modifications to the present invention will become apparent to those skilled in the art from the foregoing description and accompanying drawings. Accordingly, the present invention is to be limited solely by the scope of the following claims.

What is claimed is:

1. An optically activated light logic gate comprising for generating an output light signal in response to the presence of first and second input light signals:
   a transparent region having a predefined boundary;
   a modulation region comprising a material having a first dielectric constant and having first and second boundaries, said first boundary being coincident with said boundary of said transparent region, said modulation region having first and second indices of refractions, said first index of refraction being substantially equal to that of said transparent region, the index of refraction of said modulation region being switched between said first and second indices by the generation of an electric field in said modulation region;
   first input port means for receiving said first light signal and directing said first light signal toward said first boundary at a predetermined angle with respect to said boundary;
   first output port means positioned so as to receive the portion of said first light signal which is reflected from said first boundary;
   second input port means for receiving said second input light signal;
   field generating means for generating a potential difference between said first and second boundaries of said modulation region in response to said second port means receiving said second input light signal.

2. The optical logic gate of claim 1 further comprising second output port means for positioned to receive light input through said first port means which is not reflected from said first boundary.

3. The optical logic gate of claim 1 wherein said modulation region comprises a ferroelectric material.

4. The optical logic gate of claim 4 wherein said ferroelectric material comprises a lead lanthanum zirconate titanate.

5. The optical logic gate of claim 1 wherein said modulation region comprises a paraelectric material.

6. The optical logic gate of claim 6 wherein said paraelectric material comprises a lead lanthanum zirconate titanate.

7. The optical logic gate of claim 1 wherein said field generating means comprises:
   a first electrode overlying said transparent region and having an edge overlying said first boundary;
   a photoconductive region comprising a material having a second dielectric constant and having a boundary coincident with said second boundary of said modulation region, said photoconductive region being positioned so as to be illuminated by said light received by said second input port means; and
   a second electrode in contact with said photoconductive region and spaced apart from said second boundary of said modulation region.

8. The optical logic gate of claim 7 wherein said photoconductive region comprises a PLZT material doped with an element chosen from the group comprising silicon, iron, argon, and neodymium.

9. The optical logic gate of claim 7 wherein said second dielectric constant is less than said first dielectric constant.

* * * * *